US006996979B1

(12) United States Patent
Esch et al.

(10) Patent No.: US 6,996,979 B1
(45) Date of Patent: Feb. 14, 2006

(54) HYDRAULIC CIRCUIT FOR A HYDRAULIC EXCAVATOR

(75) Inventors: Uwe Esch, Dortmund (DE); Gottfried Drieschner, Dortmund (DE)

(73) Assignee: Terex / O&K GmbH, Dortmund (DE)

( * ) Notice: Subject to any disclaimer, the term of this patent is extended or adjusted under 35 U.S.C. 154(b) by 0 days.

(21) Appl. No.: 09/331,705

(22) PCT Filed: Oct. 21, 1997

(86) PCT No.: PCT/EP97/05792

§ 371 (c)(1),
(2), (4) Date: Oct. 25, 2004

(87) PCT Pub. No.: WO98/27287

PCT Pub. Date: Jun. 25, 1998

(30) Foreign Application Priority Data

Dec. 19, 1996 (DE) ................................ 196 52 922

(51) Int. Cl.
*F16D 31/02* (2006.01)
*F15B 13/00* (2006.01)

(52) U.S. Cl. .............................. 60/485; 60/405; 60/48; 91/510

(58) Field of Classification Search .................. 60/484, 60/485, 486, 487, 403, 405, 443; 91/509, 91/510

See application file for complete search history.

(56) References Cited

U.S. PATENT DOCUMENTS 3,279,172 A * 10/1966 Yoshito et al. ................ 60/484
3,526,288 A * 9/1970 Vanzandt et al. ............. 60/447
3,916,767 A * 11/1975 Barton ......................... 60/486
4,013,174 A 3/1977 Morrow, Sr. et al.
4,126,994 A * 11/1978 Rockwell ...................... 60/484
4,561,250 A * 12/1985 Aoyagi et al. ................ 60/486
4,756,156 A * 7/1988 Appel .......................... 60/484
4,838,755 A 6/1989 Johnson et al.

FOREIGN PATENT DOCUMENTS

| | | |
|---|---|---|
| DE | 3346973 | 12/1983 |
| DE | 44 04829 A1 | 2/1994 |
| EP | 0057930 | 2/1982 |
| EP | 0269172 | 5/1985 |
| EP | 0494070 | 1/1992 |
| FR | 2211563 | 12/1973 |
| FR | 2506803 | 5/1982 |

(Continued)

*Primary Examiner*—Edward K. Look
*Assistant Examiner*—Michael Leslie
(74) *Attorney, Agent, or Firm*—Katten Muchin Rosenman LLP

(57) ABSTRACT

A hydraulic circuit for a hydraulic excavator having a motor drive which acts on at least two closed drive circuits which are connected in parallel, each have a hydraulic pump and a hydraulic motor and which operate on a common output drive, connecting lines being provided between the hydraulic pump and the hydraulic motor of a respective drive circuit, is intended to be improved such that mutual contamination of the components of different driving means with particles in the event of damage is largely avoided and it is also made easier to ascertain the damage.

Figure 1:
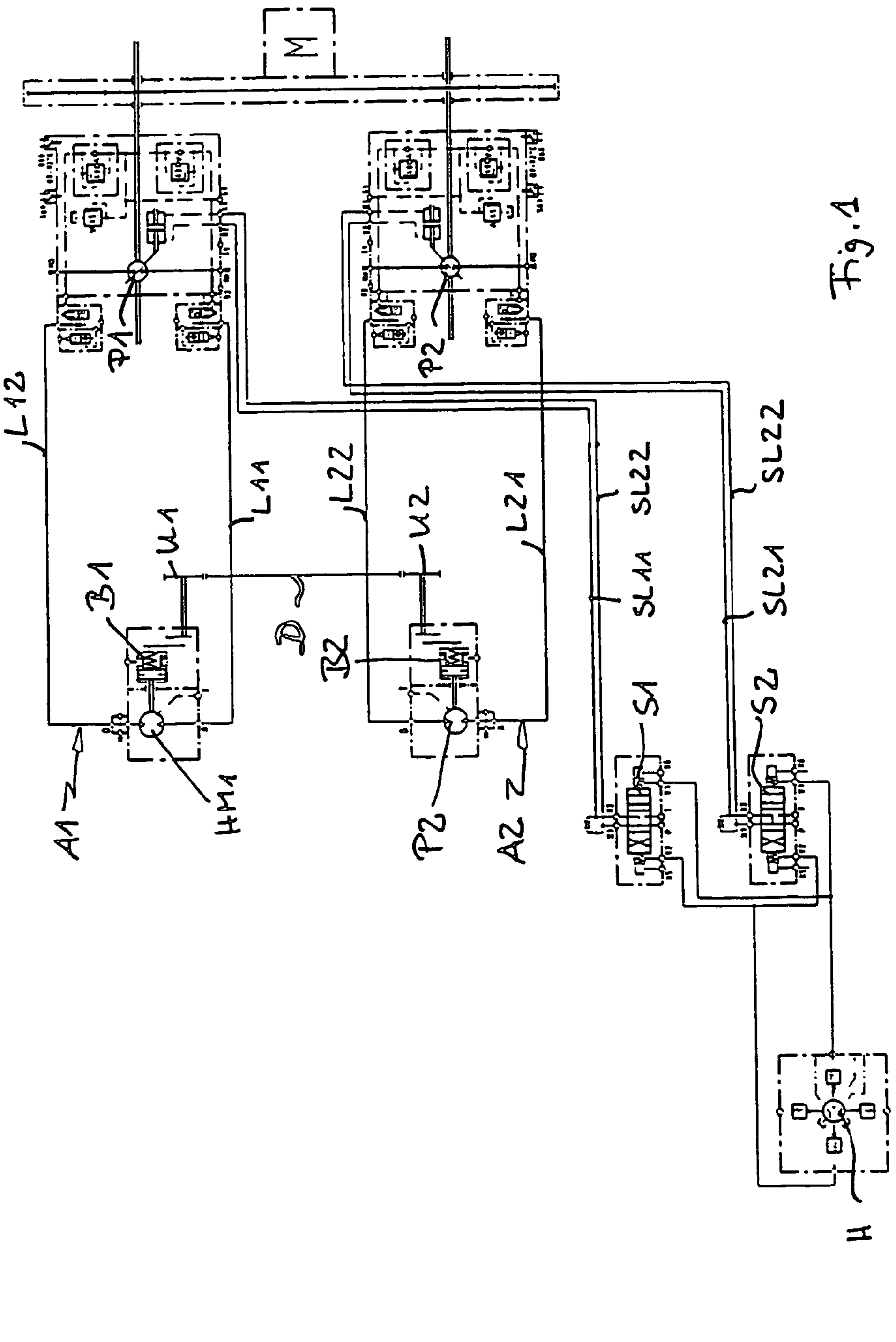

This is achieved by the connecting lines (L11, L12; L21, L22) of each drive circuit (A1, A2) being arranged only between the hydraulic pump (P1, P2) and the hydraulic motor (HM1, HM2) of the respective drive circuit (A1, A2) in such a way that there is no hydraulic connection between the different drive circuits (A1, A2), the respective drive circuit (A1, A2) each having its own control valve (S1, S2) connected to it.

4 Claims, 2 Drawing Sheets

FOREIGN PATENT DOCUMENTS

| | | |
|---|---|---|
| GB | 2097752 | 1/1982 |
| JP | 6255271 | 9/1985 |
| WO | 8103165 | 4/1981 |
| WO | 97/2553 | 7/1997 |

* cited by examiner

HYDRAULIC CIRCUIT FOR A HYDRAULIC EXCAVATOR

The invention relates to a hydraulic circuit for a hydraulic excavator having a motor drive which acts on at least two closed drive circuits which are connected in parallel, each have a hydraulic pump and a hydraulic motor and which operate on a common output drive, connecting lines being provided between the hydraulic pump and the hydraulic motor of a respective drive circuit.

The invention further relates to a hydraulic circuit for a hydraulic excavator having at least two motor drives, each of which acts on at least two closed drive circuits which are connected in parallel and each have a hydraulic pump and a hydraulic motor, in each case two drive circuits forming a drive circuit group and all the drive circuit groups being connected in parallel and operating on a common output drive, connecting lines being provided between the hydraulic pumps and hydraulic motors of a drive circuit group.

Hydraulic circuits of this type are used, for example, in hydraulic excavators which have a rotatable upper chassis which is arranged on a slewing ring and is driven by a hydrostatic drive. The hydrostatic drive has a hydraulic pump which is arranged on a motor drive (diesel or electric motor), as well as a hydraulic motor which engages in the slewing ring either directly or via a reduction gear mechanism and thus effects the rotation of the upper chassis.

Small machines are normally provided with an open hydraulic circuit, which effects the change of direction via a control slide. In contrast, larger machines have a closed hydrostatic drive circuit, in which the direction of rotation and the speed of rotation are controlled by adjusting the pump pitch angle. In many cases, two or more closed hydrostatic drive circuits are provided for design reasons, these circuits engaging jointly with their output drive shaft in the slewing ring, that is to say operating on a common output drive.

In the case of machines having at least two motor drives, each motor drive may have at least two hydrostatic drive circuits, for example in the case of large excavators. Machines of this type normally have the drive circuits connected in such a way that it is possible to operate with different rotational speeds of the motor drives or with only one motor drive, while the other is switched off, for whatever reasons. The hydrostatic drive circuits of known hydraulic circuits of this type are at present connected to one another using lines in order to produce balancing of the pressure, and hence the loading, between the drive circuits. Furthermore, common flushing and feed systems are provided, as well as common drive valves for the pump control system.

This type of hydraulic circuit has the disadvantage that, in the event of damage to a single hydrostatic component in one drive circuit, all the drive circuits which are connected to one another via connecting lines are infected with particles, so that a large number of hydrostatic components can be damaged as a consequence.

It is therefore already known to provide filter arrangements in the respective hydrostatic drive circuit, these being connected into the respective return to the pump via a non-return valve combination, with the objective of filtering out the particles. However, this filter arrangement is complicated, since it is necessary for each drive circuit and does not provide absolute security, since there are still many connections between the drive circuits, such as those for flushing, feed and control.

The object of the invention is to improve hydraulic circuits of the generic type and having one or more motor drives in such a way that mutual contamination of the components of different drive circuits or drive circuit groups with particles in the event of damage is largely avoided, and also ascertaining the damage is simplified.

This object is achieved, in a hydraulic circuit having one motor drive, by the features of patent claim 1 and, in a hydraulic circuit having at least two motor drives, by the features of patent claim 2.

According to the invention, complete isolation is thus provided between the drive circuits or drive circuit groups, that is to say there are no connecting lines at all between different drive circuits or drive circuit groups. The result of this is that, in the event of damage, the effects of the damage are limited to only one drive circuit or to only one drive circuit group, but the other drive circuits or drive circuit groups are not affected by the damage. In this case it is not possible either for the damage to be propagated via the control valves or their connecting lines, since each drive circuit or each drive circuit group is assigned its own control valve. Accordingly, in the event of damage, in each case a maximum of only one control valve can be damaged. As can be seen, this configuration also makes it simpler to ascertain the damage, since damage occurs in only one drive circuit or in one drive circuit group, at least damage with one and the same, and can thus be located more easily.

In order further to limit the effects of damage in a hydraulic circuit having at least two motor drives and, accordingly, at least two drive circuit groups, provision is advantageously made for filters to be arranged in each case in the connecting lines between the drive circuits of a drive circuit group. Thus, if damage occurs in a hydrostatic component of a drive circuit of a drive circuit group, these additional filters make it largely possible to avoid this damage being propagated from the affected drive circuit into a different drive circuit of the same drive circuit group.

Furthermore, provision is quite specifically advantageously made for each motor drive to act in each case only on one drive circuit of a respective drive circuit group. Each motor drive thus acts in each case on only one drive circuit of each drive circuit group, so that even in the event of failure or stoppage of a motor drive, the at least one other motor drive in each case drives at least one drive circuit of each drive circuit group, that is to say in the event of failure of a motor drive, all the drive circuit groups are nevertheless serviceable within certain limits.

Figure 2:
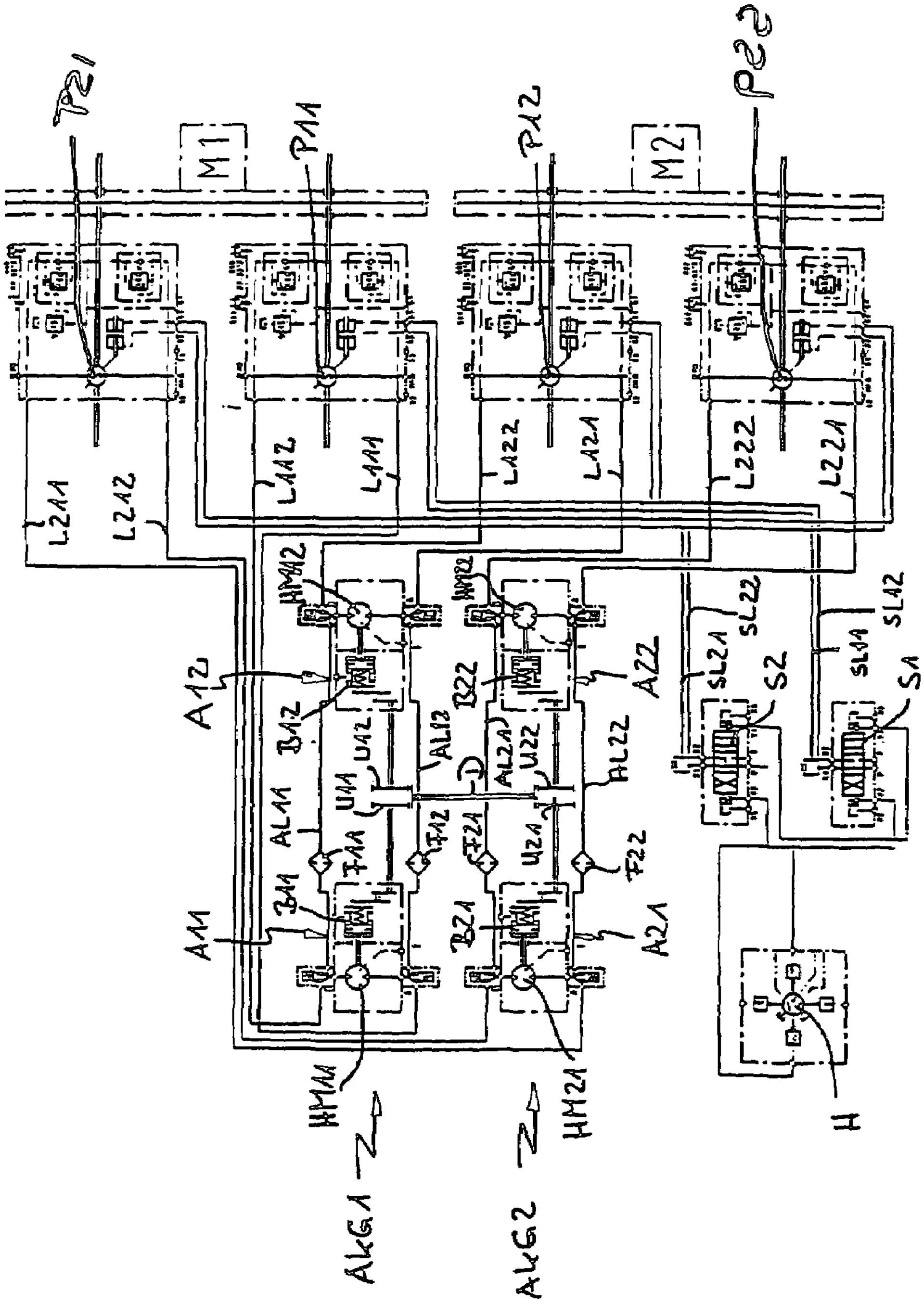

The invention is explained below by way of example using the drawing, in which:

FIG. 1 shows a circuit diagram of a hydraulic circuit according to the invention having one motor drive and two drive circuits, and FIG. 2 shows a hydraulic circuit according to the invention having two motor drives and two drive circuit groups each having two drive circuits.

FIG. 1 illustrates, as an example, a hydraulic circuit for a hydraulic excavator for driving the slewing ring of the upper chassis of this hydraulic excavator. This slewing ring of the upper chassis is denoted by the reference symbol D and thus forms the output drive from the hydraulic circuit. The hydraulic circuit itself has a motor drive M; in this case this may be a diesel or electric motor, for example.

The motor drive M acts on two drive circuits A1 and A2, which are connected in parallel, each operate jointly on the slewing ring D and are closed drive circuits.

The drive circuit A1 has a pump P1 which is acted on by the motor drive M and is connected via connecting lines L11 and L12 to a hydraulic motor HM1 having a brake B1. On the output side, this hydraulic motor HM1 engages via a reduction gearbox U1 in the slewing ring D of the hydraulic excavator.

The second drive circuit A2, connected in parallel, is built up in the same way. It has a hydraulic pump P2, which is acted on by the motor drive M. This hydraulic pump P2 is connected via connecting lines L21 and L22 to a hydraulic motor HM2, which is likewise equipped with a brake B2. On the output drive side, this hydraulic motor HM2 engages via a reduction gearbox U2 in the slewing ring D of the hydraulic excavator.

In order to control the drive circuits A1 and A2, each drive circuit is separately assigned its own control valve S1 and S2, respectively, the control valve S1 for the drive circuit A1 being connected via control lines SL11 and SL12 only to the drive circuit A1, while the control valve S2 is connected via control lines SL21 and SL22 only to the drive circuit A2. The control valves S1 and S2 are each connected in a known way to a common manual control lever H.

As can be seen, the two closed drive circuits A1 and A2 are completely isolated from each other. If damage then occurs in a hydrostatic component of one drive circuit, the possibility is then ruled out that particles released by this damage could pass into the other drive circuit and could also damage components there. Since the drive circuit which is not affected by the damage is thus not impaired, the serviceability of the hydraulic excavator is maintained, naturally within limits.

FIG. 2 illustrates a hydraulic circuit for a hydraulic excavator having two motor drives M1 and M2. This hydraulic circuit has two drive circuit groups AKG1 and AKG2, which are connected in parallel and each of which operates on a common output drive, namely on the slewing ring D of the upper chassis of a hydraulic excavator. In this case, the first drive circuit group AKG1 comprises a drive circuit A11 and a drive circuit A12 connected in parallel, while the drive circuit group AKG2 comprises a drive circuit A21 and a drive circuit A22 connected in parallel.

As in the exemplary embodiment according to FIG. 1, each drive circuit has in each case a hydraulic pump which is driven by a motor, and a hydraulic motor with a brake, the respective hydraulic motor operating via a reduction gearbox on the common slewing ring D. These above-mentioned hydraulic components are in this case designated in the following way in the drawing:

The drive circuit A11 has a hydraulic pump P11 and a hydraulic motor HM11 with a brake B11 and reduction gearbox U11. In this case, the hydraulic motor HM11 and the pump P11 are connected to each other via connecting lines L111 and L112, and the pump P11 is driven by the motor drive M1.

The drive circuit A12 of the first drive circuit group AKG1 has a hydraulic pump P12 and a hydraulic motor HM12 with a brake B12 and a reduction gearbox U12 on the output drive side. In this case, the hydraulic motor HM12 and the hydraulic pump P12 are connected to each other via connecting lines L121 and L122, and the pump P12 has a drive connection to the motor drive M2.

The drive circuit A21 of the second drive circuit group AKG2 has a hydraulic pump P21, a hydraulic motor AM21 with a brake B21 and a reduction gearbox U21. The hydraulic motor HM21 and the hydraulic pump P21 are connected to each other via connecting lines L211 and L212, and the hydraulic pump P21 is driven by the motor drive M1.

The drive circuit A22 of the second drive circuit group AKG2 has a hydraulic pump P22 and a hydraulic motor HM22 with a brake P22, as well as a reduction gearbox U22. The pump P22 and the hydraulic motor HM22 are connected to each other via connecting lines L221 and L222, and the hydraulic pump P22 is driven by the motor drive M2.

Balancing lines with filters are in each case provided between the drive circuits of a drive circuit group. Between the drive circuit A11 and the drive circuit A12 of the drive circuit group AKG1, these balancing lines are designated by AL11 and AL12, and the filters are correspondingly denoted by F11 and F12. In the case of the drive circuit group AKG2, the balancing lines are designated by AL21 and AL22, and the filters by F21 and F22.

The hydraulic pumps of each drive circuit group each has its own control valve, the control valve of the drive circuit group AKG1 being designated by S1 and the control valve of the drive circuit group AKG2 being designated by S2. Both control valves S1 and S2 can be operated via a manual control lever H. Each control valve S1 and S2 is respectively connected via control lines only to its own drive circuit group, the control valve S1 to the drive circuit group AKG1, namely via control lines SL11 and SL12, and the control valve S2 to the drive circuit group AKG2 via control lines SL21 and SL22.

It can be seen from the hydraulic circuit described above that the connecting lines of each drive circuit group are arranged only between the hydraulic pumps and the hydraulic motors of the respective drive circuit group, but there is no hydraulic connection of any type between the different drive circuit groups AKG1 and AKG2. In addition, as described above, each respective drive control group has its own control valve connected to it. There is thus complete isolation between the two drive circuit groups, so that in the event of damage in one drive circuit group, particles which are released as a result of the damage cannot get into the hydraulic components of the other drive circuit group. Furthermore, as a result of filters having been provided in the balancing lines between the drive circuits of a respective drive circuit group, it is also largely reliably ensured that particles released in one drive circuit cannot get into the hydraulic components of the other drive circuit of the same drive circuit group.

Finally, the cross-coupling according to the invention of the motor drives M1 and M2 in each case to only one drive circuit of a respective drive circuit group ensures that the hydraulic drive still operates, within certain limits, even when one motor drive fails.

The invention is of course not restricted to the exemplary embodiments illustrated. Further refinements are possible without leaving the basic idea. Thus, the exemplary embodiment according to FIG. 2 can be transferred in a similar way to a hydraulic circuit which has more than two motor drives.

What is claimed is:

1. A hydraulic circuit for a hydraulic excavator having at least two motor drives, each of which acts on at least two closed drive circuits which are connected in parallel and each has a hydraulic pump and a hydraulic motor, in each case two drive circuits forming a drive circuit group and all the drive circuit groups being connected in parallel and operating on a common output drive, connecting lines being provided between the hydraulic pumps and hydraulic motors of each drive circuit group, wherein the connecting lines (L111, L112; L121, L122; L211, L212; L221, L222) of each drive circuit group (AKG1, AKG2) are arranged only between the hydraulic pumps (P11, P12; P21, P22) and the hydraulic motors (HM11, HM12; HM21, HM22) of the respective drive circuit group (AKG1, AKG2), in such a way that there is no hydraulic connection between the different drive circuit groups (AKG1, AKG2), the respective drive circuit group (AKG1, AKG2) each having its own control valve (S1, S2) connected to it.

2. The hydraulic circuit as claimed in claim 1, wherein filters (F11, F12; F21, F22) are in each case arranged in the connecting lines (AL11, AL12; AL21, AL22) between the drive circuits of one (A11, A12; A21, A22) drive circuit group.

3. The hydraulic circuit as claimed in claim 1 wherein each motor drive (M1, M2) acts in each case on only one drive circuit of a respective drive circuit group (AKG1, AKG2).

4. The hydraulic circuit of claim 2, wherein each motor drive acts only on one drive circuit for a respective drive circuit group.

* * * * *